Feb. 26, 1929.
S. J. KNIATT
1,703,111
METHOD OF WELDING
Filed March 13, 1928
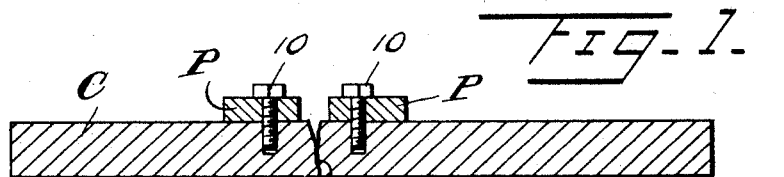
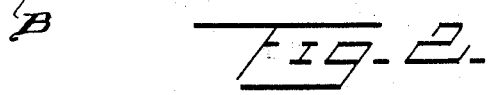
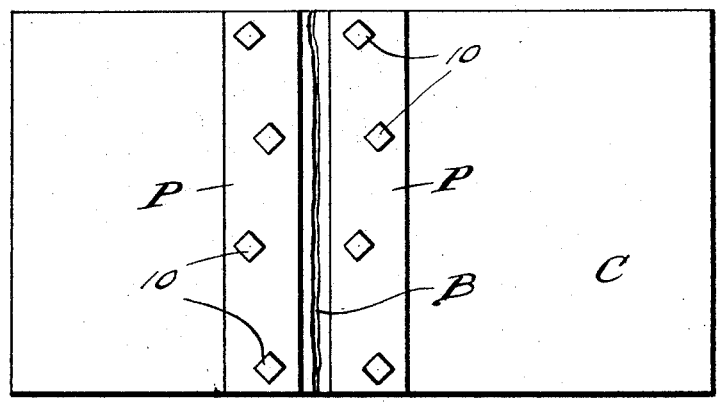
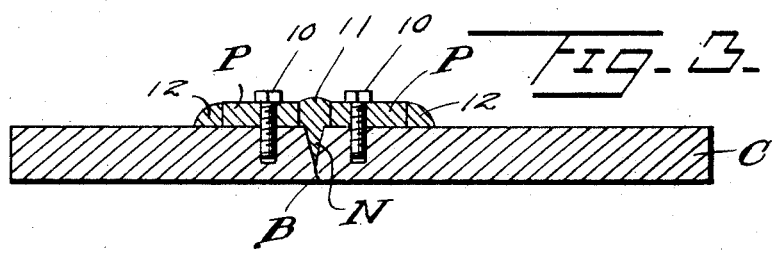
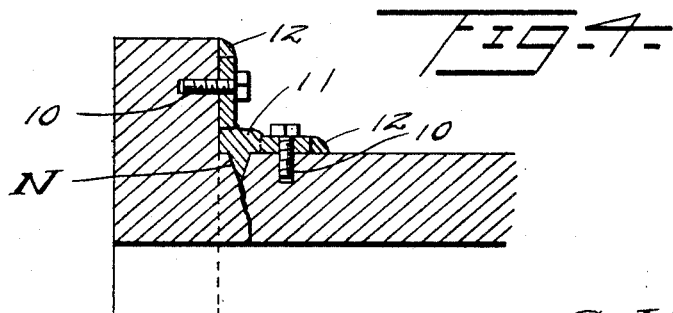
Inventor
S. J. Kniatt
By Watson E. Coleman
Attorney Patented Feb. 26, 1929.

1,703,111

UNITED STATES PATENT OFFICE.

STEPHEN J. KNIATT, OF PHILADELPHIA, PENNSYLVANIA.

METHOD OF WELDING.

Application filed March 13, 1928. Serial No. 261,333.

This invention relates to a method of welding and more particularly to a method of welding, permitting the production of a strongly welded union between the sections of broken metallic articles in such manner that the edges of the break are drawn together and the form of the original casting restored.

A further object of the invention is to provide a welding method which will eliminate the system now commonly employed of removing the break to form a slot and thus necessitating placing of the weld upon a base from which the welded material may be built up.

These and other objects I attain by the method hereinafter described and illustrated in the accompanying drawing, wherein:—

Figure 1 is a sectional view through a casting prepared for welding in accordance with my invention;

Figure 2 is a plan view thereof;

Figure 3 is a section through the finished weld;

Figure 4 is a section through a second weld;

Figure 5 is a view showing a further step which may be included, if desired.

In accordance with my invention, I secure to the plate or casting C which is to be welded at opposite sides of the break B therein a pair of plates P coextensive with the break and of a desired thickness. These plates may be secured in position either by bolts 10 or other suitable means. The casting C is provided longitudinally of the break with a V-shaped notch N of less depth than the thickness of the casting, so that it opens only through that face of the casting to which the plates are applied. The edges of these plates are then welded to the casting, as indicated at 12, and, if desired, the heads of the bolts may be welded to the plates, as indicated at 13 in Figure 5. This groove is then filled with the welding material 11, which is deposited after the usual manner of forming a weld and the deposit continued until the space between the plates P is filled, as well as this notch.

By employing a weld of this character, leaky welded joints may be successfully prevented under circumstances where this is otherwise impossible. Often a crack of this character has been in existence for a considerable time before it is actually discovered and during the period of its existence, the porous material of the casting at opposite sides of the crack may absorb substances, rendering the production of a perfect weld impossible without cutting away a considerable portion of the casting. Under many circumstances, as when welding a portion of a cylinder, such as indicated in Figure 4, it is either inconvenient or impossible to continue the weld to the inner surface of the casting. Therefore, a weak union is often found in welding operation of this character, and furthermore, due to faulty adhesion, leakage will often be present about the weld.

By this construction, the welded union between the plates P at 11 provides a seal across the break and the welding of the edges of this plate at 12 to the casting provides a perfect seal over the break. The increased depth of the weld 11 permitted by the application of the plates provides a considerable reinforcement of the casting and the application of the plates themselves provides such additional reinforcement as will insure a connection which is stronger than the remainder of the casting. Additionally, the shrinkage or contraction resulting causes the edges of the break to be drawn solidly together, restoring the casting to its original form.

As the method is obviously capable of a certain degree of modification without in any manner departing from the spirit of the invention, I do not limit myself thereto except as hereinafter claimed.

I claim:—

1. The method of welding broken castings consisting in notching the casting at the break, securing plates to the casting at opposite sides of the notch, and connecting adjacent edges of the plates and the casting with a weld filling the notch and the space between the plates.

2. The method of welding broken castings consisting in notching the casting at the break, securing plates to the casting at opposite sides of the notch, connecting adjacent edges of the plates and the casting by a weld filling the notch and the space between the plates, and welding the outer edges of the plates to the casting.

In testimony whereof I hereunto affix my signature.

STEPHEN J. KNIATT.